United States Patent
Ralphs et al.

(10) Patent No.: US 9,541,648 B2
(45) Date of Patent: Jan. 10, 2017

(54) SYSTEM AND METHOD OF COMMUNICATING GNSS INFORMATION BETWEEN MOBILE MACHINES

(71) Applicant: AGCO Corporation, Hesston, KS (US)

(72) Inventors: Matthew Isaac Ralphs, Newton, KS (US); Aaron Patrick Osner, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/574,870

(22) Filed: Dec. 18, 2014

(65) Prior Publication Data

US 2015/0168560 A1    Jun. 18, 2015

Related U.S. Application Data

(60) Provisional application No. 62/017,399, filed on Jun. 26, 2014, provisional application No. 61/917,679, filed on Dec. 18, 2013.

(51) Int. Cl.

| | |
|---|---|
| *G01S 19/13* | (2010.01) |
| *G01C 21/00* | (2006.01) |
| *G01S 19/04* | (2010.01) |
| *G01C 21/20* | (2006.01) |
| *G01S 19/14* | (2010.01) |
| *G01S 19/35* | (2010.01) |

(52) U.S. Cl.
CPC ............... *G01S 19/04* (2013.01); *G01C 21/20* (2013.01); *G01S 19/14* (2013.01); *G01S 19/35* (2013.01)

(58) Field of Classification Search
CPC .......... G01S 19/04; G01S 19/14; G01S 19/35; G01C 21/20
USPC .......................................................... 701/23
See application file for complete search history.

(56) References Cited

U.S. PATENT DOCUMENTS

| | | |
|---|---|---|
| 6,397,147 B1 | 5/2002 | Whitehead |
| 6,469,663 B1 | 10/2002 | Whitehead et al. |
| 7,737,887 B2 | 6/2010 | Remondi |
| 8,018,376 B2 | 9/2011 | McClure et al. |
| 8,174,437 B2 | 5/2012 | Whitehead |
| 8,271,194 B2 | 9/2012 | Whitehead et al. |
| 8,594,879 B2 | 11/2013 | Roberge et al. |
| 8,649,930 B2 | 2/2014 | Reeve et al. |
| 2009/0251366 A1* | 10/2009 | McClure ............... G01C 21/00 342/357.31 |
| 2010/0292871 A1* | 11/2010 | Schultz ................. G01C 21/00 701/3 |

* cited by examiner

*Primary Examiner* — Anne M Antonucci

(57) ABSTRACT

In one embodiment, a method comprising, receiving at a moving vehicle first global navigation satellite systems (GNSS) information broadcasted from a base station and second GNSS information provided by one or more satellites; determining by a processor residing in the vehicle a position of the vehicle based on the first and second GNSS information; and re-broadcasting the first GNSS information to a receiver located remotely from the moving vehicle.

15 Claims, 3 Drawing Sheets

SYSTEM AND METHOD OF COMMUNICATING GNSS INFORMATION BETWEEN MOBILE MACHINES

CROSS REFERENCE TO RELATED APPLICATIONS

This application claims the benefit of U.S. Provisional Application Nos. 61/917,679 filed Dec. 18, 2013, and 62/017,399, filed Jun. 26, 2014, both of which are hereby incorporated by reference in their entirety.

TECHNICAL FIELD

The present disclosure is generally related to positioning systems and devices for vehicles.

BACKGROUND

Global Navigation Satellite Systems (GNSS) provide geographical positioning information from a plurality of orbiting satellites to receivers around the globe including at sea, on the ground, and in the air. The best known of these systems is the U.S. Global Positioning System (GPS), but other systems, such as the Russian GLONASS system, the European Union's Galileo, and China's Compass systems, provide a similar service. They are collectively known as Global Navigation Satellite Systems, and they can provide position accuracies in the range of about ten (10) meters to about fifteen (15) meters. Although the satellites can potentially provide more accurate positions, atmospheric and other effects degrade the quality of the satellite signals.

Unfortunately, GNSS systems are not sufficiently accurate for all applications. An agricultural vehicle operating in a field, for example, may require positioning accuracies of less than one (1) meter. Satellite signals from GNSS systems can be corrected by using one or more reference stations at precisely known locations, which broadcast corrections to GNSS receivers, by way of geostationary satellites for instance (e.g., via Satellite Based Augmentation Systems), in the vicinity of the reference stations. This technique is known as a Differential GNSS (DGNSS) service and it is used to enable precise navigation for ships, aircrafts, and ground vehicles (e.g., vehicles). Positioning systems that leverage the DGNSS service using reference stations and geostationary satellites have sub-meter level precision, enabling tractors to cross agricultural fields in precisely the same track every time, improving crop yields, and in other industries, enabling snow plows, for instance, to operate quickly over roads buried beneath an otherwise trackless snow field. Some systems can achieve decimeter-level precision, where satellites are used to measure ionosphere and clock errors and then pass the resulting corrections to receivers.

Real Time Kinematic (RTK) satellite navigation is another technique used to enhance the precision of position data derived from satellite-based positioning systems using measurements of the phase(s) of a tracked satellite signal's carrier wave(s), rather than the information content of the signal. RTK systems use a single base station transceiver (or transmitter) as a reference station (e.g., with known geographical coordinates) to provide real-time corrections or correctors to a number of mobile units (e.g., rover receiver units). The base station broadcasts the correction to the observed phase based on its known location, and the mobile units apply the broadcast correction to their own respective phase measurements. The range of an RTK base station is limited, and the RTK base station may use a real-time communications channel, such as an RF signal, to communicate GNSS information (e.g., correction information or correctors) to the mobile units (e.g., vehicles).

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
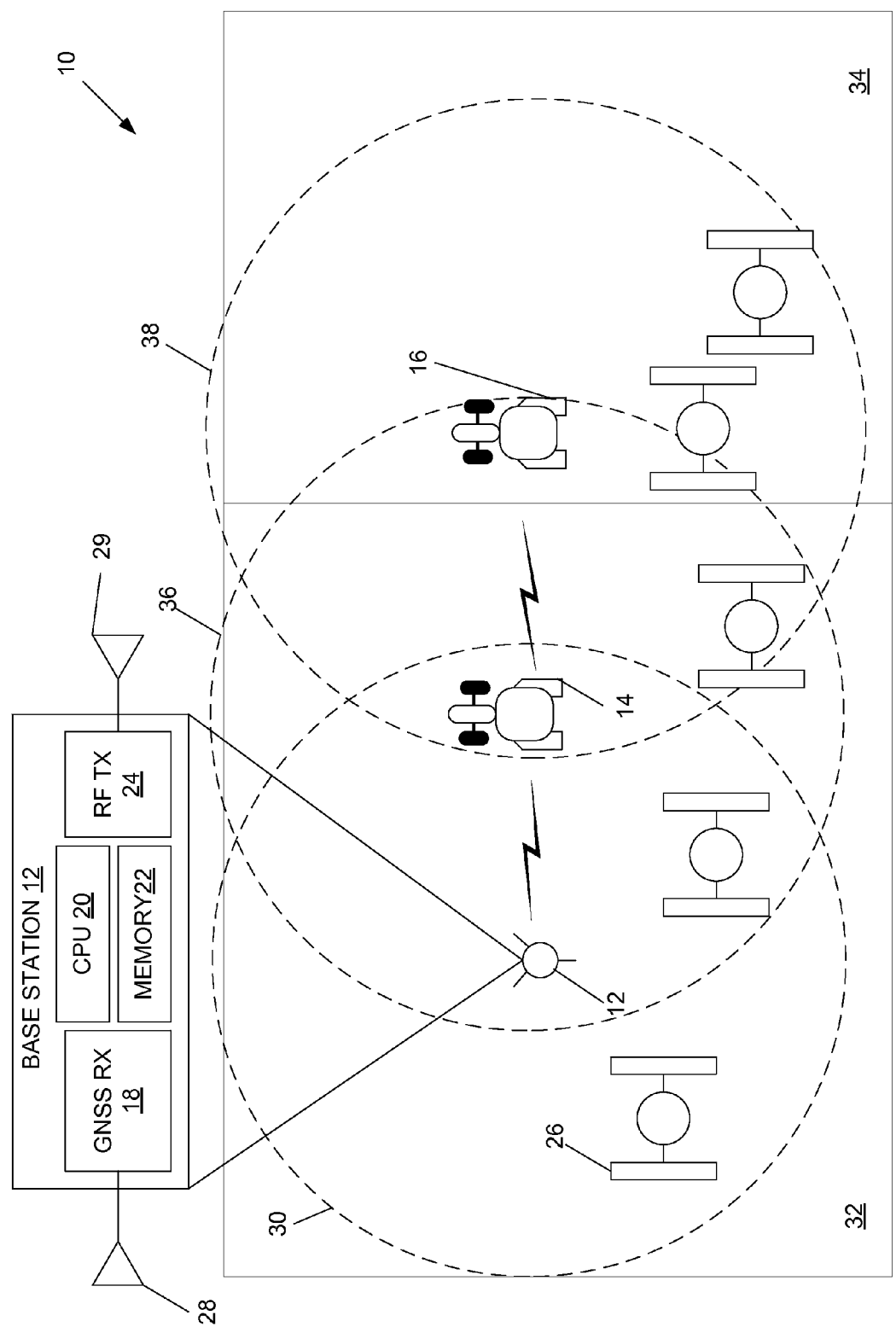
FIG. 1 is a schematic diagram that illustrates in overhead view an embodiment of an example Global Navigation Satellite Systems (GNSS) information repeater system.

In one embodiment, a method comprising, receiving at a moving vehicle first global navigation satellite systems (GNSS) information broadcasted from a base station and second GNSS information provided by one or more satellites; determining by a processor residing in the vehicle a position of the vehicle based on the first and second GNSS information; and re-broadcasting the first GNSS information to a receiver located remotely from the moving vehicle.

Detailed Description

Certain embodiments of a Global Navigation Satellite Systems (GNSS) information repeater system and method are disclosed that enables a vehicle working within a range of an original Real Time Kinematic (RTK) base station to rebroadcast RTK correction information or messages beyond the range of the RTK base station, thus extending the coverage area, often without requiring any additional hardware. In one embodiment, each vehicle among a fleet of vehicles that receives RTK correction information uses the same information along with the received satellite signals for more accurately determining its position (e.g., geographical coordinates) and rebroadcasts the RTK correction information to one or more receivers at a remote location to extend the range and perpetuate the RTK correction information. The RTK correction information may be repeated to circumvent obstacles (e.g., hills, tree lines, etc.) that block the original RTK correction information (i.e., the RTK correction information broadcast by the RTK base station) from being received at a receiver hosted by another vehicle or device (e.g., a fixed repeater, server, etc.). In some embodiments, the aforementioned GNSS information repeater method may be used on a single vehicle as a repeater to another vehicle located further away, enabling passage of the RTK correction information only once. In some embodiments, the GNSS information repeater method may be used with several vehicles operating as repeaters to pass the RTK correction information further away.

Digressing briefly, current RTK base station ranges are limited by the technology used to implement them, the terrain, and/or output power regulations or constraints. Conventional RTK repeaters may be used to mitigate these limitations, yet current repeaters comprise dedicated hardware and are generally installed in stationary (e.g., with known geographical coordinates) or at least semi-permanent locations, making such equipment an extended range solution for a fixed or semi-fixed area. Further, with static repeaters, there is a need for a reliable power source wherever the repeater is installed. When installing a single repeater, it is not too difficult to set up a reliable power source. However, for a chain of repeaters that are arranged to provide extended coverage, the provision of needed power resources becomes more difficult, and adaptability in coverage (e.g., by moving the repeater(s)) is also an obstacle given the need for a respective power resource at each repeater location. In contrast, certain embodiments of GNSS information repeater systems can often make use of current hardware (e.g., via software modification) presently used to receive the RTK correction information for use in a co-located or otherwise coupled guidance controller (e.g., of an auto steering mechanism and/or navigational guidance system) of the host vehicle to also rebroadcast the RTK correction information. Also, certain embodiments of a GNSS information repeater system comprise repeaters that may all be mobile (though not limited to an entirely mobile repeater network), enabling adaptability in position and hence providing dynamic coverage. For instance, when operation involves a fleet of vehicles, it is common for the vehicles to move from field-to-field in sequence. Accordingly, as the fleet moves from field to field around the RTK base station, the area covered by the RTK correction information also dynamically moves.

Having summarized certain features of GNSS information repeater systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, emphasis is placed on a vehicle embodied as an agricultural vehicle (e.g., combine harvester, tractor, baler, planter, sprayer, forager, windrower, etc.), though it should be appreciated that some embodiments of GNSS information repeater systems may use vehicles in different industries, such as bulldozers, graders, etc., further including support vehicles (e.g., truck and trailer combinations) for the same or different industries. In general, one or more embodiments of GNSS information repeater systems may use vehicles that are configured to receive, while in motion, GNSS information (e.g., satellite signals) and broadcast (or unicast in some embodiments) RTK correction information from a reference station (e.g., base station) to a roving unit (e.g., a receiver hosted by a vehicle) and to communicate (e.g., rebroadcast) the RTK correction information to another receiver (e.g., of a roving unit or permanent or semi-permanent device, such as a stationary repeater, a server, etc.). Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set forth in the description.

Reference is made to FIG. 1, which illustrates an embodiment of an example Global Navigation Satellite Systems (GNSS) information repeater system 10. The GNSS information repeater system 10 depicted in FIG. 1 comprises a base station 12 and vehicles 14 and 16. In one example scenario, the vehicles 14 and 16 are embodied as agricultural vehicles, and the base station 12 may operate as a Real Time Kinematic (RTK) reference station. The base station 12 comprises well-known circuitry, such as a GNSS receiver (GNSS RX) 18, a processor (e.g., central processing unit, or CPU) 20, memory 22, and radio frequency (RF) transmitter circuitry 24 (e.g., radio modem operating in the UHF or VHF range). As is known, the GNSS receiver circuitry 18 receives satellite signals from a network of satellites 26 via a GNSS antenna 28. The GNSS receiver circuitry 18, in cooperation with the processor 20 and executable code in the memory 22, tracks carrier phase information from one or more signals (e.g., L1 and/or L2 in Global Positioning System (GPS) environments) to correct for differences between the known geographical coordinates of the base station 12 and the satellite-determined position. The resulting correction (e.g., RTK correction information) of these differences is broadcast (or in some embodiments, communicated via a unicast mode) by the RF transmitter circuitry 24 via an RF antenna 29 according to a predetermined communications range 30 (e.g., approximately three (3) to eight (8) kilometers). It should be appreciated by one having ordinary skill in the art that these range values are merely illustrative of one example, and that the communications range 30 may vary depending on one or more parameters and/or conditions, such as power, antenna type, terrain, etc. The RTK correction information is valid beyond the communications range 30. For instance, in some embodiments, the RTK correction information may be valid in a range of approximately 10-20 kilometers. In some embodiments, the RTK correction information may be valid for up to 30 kilometers. Communication of the RTK correction information may be implemented according to one or more known industry-wide or proprietary protocols or their respective variants, such as Compact Measurement Record (CMR), Radio Technical Commission for Maritime Services (RTCM). In some embodiments, data collected from a network of base stations may be used to provide the RTK correction information. An example of a suitable base station 12 may be one manufactured by Trimble, such as an AgGPS 542 RTK base station, among others well known in the industry. As base station technology is well-known to those having ordinary skill in the art, further discussion of the same is omitted here for brevity.

Vehicles located within the communications range 30 and still within a range of validity of the communicated RTK correction information, such as the vehicle 14 (as denoted by the vehicle 14 residing within the dashed circle symbolically representing the communications range 30 of the base station RF transmitter circuitry 24), comprise RF receiver circuitry that receives the RTK correction information from the base station 12. In some embodiments, the communication of the RTK correction information to the vehicle 14 may be achieved via one or more networks (e.g., in lieu of the line-of-sight (LOS) communications enabled by the radio modem of the base station 12), such as where the base station 12 communicates the RTK correction information to a computer network (e.g., server network), which in turn relays the RTK correction information to the vehicle 14 (e.g., equipped with RF receiver functionality embodied as a cellular modem, such as a connect card or SIM card) via a cellular network.

Continuing, the vehicle 14 is shown operating in a first field 32, and the vehicle 14 is moving within an area encompassed by the communications range 30 of the base station 12 and within a range of validity of the RTK correction information. The vehicle 16 is shown operating in a second field 34 (or in some scenarios, the same field 32 as the first vehicle) that is beyond the communications range 30 of the base station 12 yet within a communications range 36 of RF transmitter circuitry residing in the vehicle 14 and still within a range of validity of the RTK correction information. As indicated above, RF receiver circuitry of the vehicle 14 receives the RTK correction information communicated (via LOS, or in some embodiments, over one or more other networks) from the base station 12, and computational logic within the vehicle 14 uses the RTK correction information to enhance position information derived from an on-board positioning device or system of the vehicle 14 that processes the satellite signals from the satellites 26. RF transmitter circuitry of the vehicle 14 wirelessly communicates (e.g., rebroadcasts or unicasts) the RTK correction information received from the base station 12 to RF receiver circuitry of the vehicle 16, which uses the RTK correction information to enhance position information derived from satellite signals received from the satellites 26. In addition to the range of validity of the RTK correction information referenced previously, the reliability and accuracy of the RTK correction information depends, at least in part, on its timeliness. Therefore, the transmitter circuitry of the vehicle 14 is configured to communicate the RTK correction information to the vehicle 16 as quickly as possible and, in some embodiments, as close to real-time as possible. In some embodiments, the vehicles 14 and 16 are in motion while transmitting and receiving the RTK correction information. In some embodiments, the determination of position information based on satellite signals received at the vehicles 14 and 16 plus the received RTK correction information and the rebroadcast of the RTK correction information occur concurrently or substantially concurrently.

Note that the GNSS information repeater system 10 depicted in, and described in association with, FIG. 1 is merely illustrative, and that some embodiments may include additional components. For instance, a third vehicle (e.g., another combine harvester, support vehicle, etc.) may be operating in a third field that is beyond the communications range 30 of the base station 12 and the communications range 36 of the vehicle 14, yet within a communications range 38 of RF transmitter circuitry residing on the vehicle 16 and still within a range of validity of the RTK correction information. RF transmitter circuitry of the vehicle 16 may be configured to communicate the RTK correction information to the third vehicle, effectively extending the range of the base station 12 even further, and more importantly, propagating the RTK correction information up to its validity range. Likewise, in some implementations, other vehicles may be within range of the vehicle 14 such that transmitter circuitry of the vehicle 14 communicates the RTK correction information to multiple vehicles simultaneously. Note that the communications ranges 30, 36, and 38 are all depicted in FIG. 1 having a similar range, though in some embodiments, the ranges may be different among the different components.

Note that the GNSS information repeater system 10 described above in association with FIG. 1 uses RTK correction information, though in some embodiments, GNSS correction information from sources other than an RTK reference station may be used. In some embodiments, communications among vehicles 14 and 16 of the GNSS information repeater system 10 may include an indicator of reliability, such as a number of times the RTK correction information has been repeated, or a predetermined range of validity for the RTK correction information having coordinates or other information that enables a determination of whether the RTK correction information has been acquired beyond its range of validity. In one example scenario, the RF receiver circuitry of each vehicle of the GNSS information repeater system 10 may receive multiple signals repeating RTK correction information originating from the base station 12. The receiver circuitry may select a single signal based on any of various factors, such as time of receipt of the signal, signal strength, and/or other indicators of reliability.

In some embodiments, the vehicle 14 (and/or vehicle 16) may include gateway functionality for communications with a computing network (e.g., the Internet) and that is configured to receive GNSS information from one or more sources using Networked Transport of RTCM via Internet Protocol (NTRIP). For instance, the vehicle 14 may be configured to communicate the GNSS information to another vehicle in the vicinity of the vehicle 14. The proximally located vehicle may not be capable of communicating with the computing network, or may be out of range of a communications network (e.g., cell network) that enables communications with the computer network. The vehicle 14 may be operating at a location with a higher surface elevation, for example, while the proximally located vehicle is operating at a location with a lower surface elevation, such that the vehicle 14 has reliable access to a communications network while the proximally located vehicle has only unreliable access (or no access, or no on-board cellular modem) to the computer network. These and/or other scenarios may be facilitated by the roving repeater technology of one or more embodiments of GNSS information repeater system 10, as should be appreciated by one having ordinary skill in the art in the context of the present disclosure.

Figure 2:
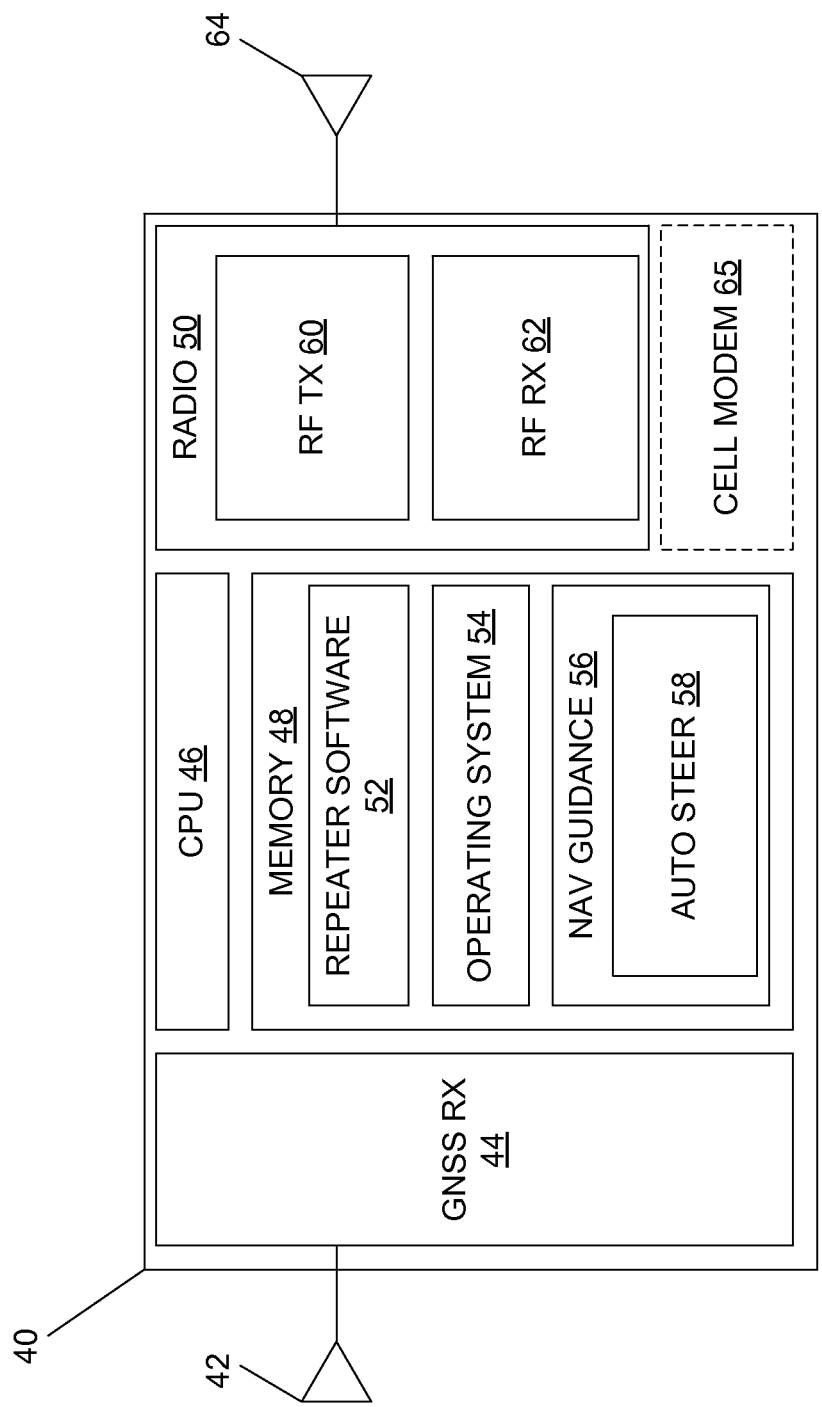
FIG. 2 is a block diagram that illustrates an embodiment of an example roving repeater unit of the GNSS information repeater system.

Referring now to FIG. 2, shown is an embodiment of an example roving repeater unit 40 that is incorporated in the vehicle 14 (and/or vehicle 16) of the GNSS information repeater system 10 of FIG. 1. It should be appreciated by one having ordinary skill in the art in the context of the present disclosure that the architecture depicted in FIG. 2 is merely illustrative of one embodiment, and that some embodiments may include additional, fewer, and/or different components that provide mobile repeating functionality (e.g., RF transmission and receiving of RTK correction information). In one embodiment, the roving repeater unit 40 comprises one or more GNSS antennas 42, GNSS receiver circuitry 44, one or more processor 46 (e.g., CPU), a memory 48, and a radio 50. In one embodiment, the memory 48 comprises roving repeater software 52, an operating system 54, and navigational guidance software 56 that comprises an auto steering mechanism (software) 58. The radio 50 may be embodied as an RF modem, and comprises well-known RF transmitter circuitry 60, RF receiver circuitry 62, and an RF antenna 64 (e.g., high gain or directional antenna). The GNSS receiver circuitry 44 is configured to receive and track satellite signals from plural satellites 26 (FIG. 1) via the GNSS antenna 42. As is known, for coarse-level resolution, the GNSS receiver circuitry 44, in cooperation with the processor 46 and programming code in memory 48, processes the GNSS information (e.g., C/A and P code and carrier information) received from the GNSS antenna 42 and compares the same to internally generated (e.g., by the processor 46 or by a random or pseudo random number generator) pseudo-random codes. The processor 46 measures a time-shift required to align the internally generated and received codes to compute an unambiguous pseudo-range to the satellite(s)

26. For finer resolution, the carrier signal (e.g., the dominant spectral component remaining in the radio signal after the spectral content caused by the modulated pseudorandom digital codes (C/A and P) is removed)) is tracked by the GNSS receiver circuitry 44, enabling measurements of the carrier phase to a small fraction of a complete wavelength, permitting centimeter-level (e.g., 2 centimeter) accuracy. In the case of the roving repeater unit 40 disposed in the vehicle 14, the observed carrier phase information received via the GNSS receiver circuitry 44 is corrected for by the processor 46 according to the RTK correction information received from the base station 12 (FIG. 1) via the RF receiver circuitry 62 of the radio 50. The processor 46 in cooperation with executable code stored in memory 48 determines the position coordinates of the vehicle 14 according to the RTK correction information received via the RF antenna 64 and RF receiver circuitry 62 and the satellite signals received via the GNSS antenna 42 and GNSS receiver circuitry 44. Proximally in time to the position determination (e.g., concurrently or overlapping in time), the roving repeater software 52 configures the radio 50 to effect transmission (e.g., rebroadcast) of the RTK correction information via the RF transmitter circuitry 60 and RF antenna 64. The rebroadcast RTK correction information may be received by the vehicle 16, which is similarly equipped with a roving repeater unit 40 to receive satellite signals and the RTK correction information and perform processing to determine its position within centimeter-level accuracy. Note that in some embodiments, the roving repeater unit 40 may optionally comprise a cellular modem 65, as shown in phantom in FIG. 2. Those shown as a separate piece of hardware in FIG. 2 (e.g., separate from the radio 50), in some embodiments, the functionality of the radio 50 and cellular modem 65 may be embodied in the same piece or package of hardware, with cellular modem functionality enabled via a data card. In some embodiments of GNSS information repeater systems 10, the roving repeater unit 40 of one vehicle may comprise a different architecture than the roving repeater unit 40 of another vehicle. For instance, where the RTK correction information is received by the vehicle 14 over a cellular network, the roving repeater unit 40 comprises the cellular modem 65 to receive the RTK correction information and the RF modem (e.g., radio 50, and coupled to the antenna 64) to broadcast the RTK correction information to other roving repeater units 40 of other vehicles, such as vehicle 16. The vehicle 16, on the other hand, may only require the radio 50 and antenna 64 to receive the broadcast RTK correction information (and not the cellular modem 65). Other variations of architectures may also be implemented, as should be appreciated by one having ordinary skill in the art in the context of the present disclosure, and hence are contemplated to be within the scope of the disclosure.

The position information determined by the roving repeater unit 40 may be used as input to the navigational guidance software 56 to cause autonomous (or semi-autonomous) guided movement of the host vehicle (e.g., vehicle 14). For instance, the position information may be used by the auto steering mechanism 58 to correct a heading of the host vehicle 14 traversing a field according to a given wayline after driving over (or avoiding) an obstacle that alters the guided path.

In one embodiment, the memory 48 may include any one or a combination of volatile memory elements (e.g., random-access memory RAM, such as DRAM, and SRAM, etc.) and nonvolatile memory elements (e.g., ROM, hard drive, tape, CDROM, etc.). It should be appreciated that in some embodiments, additional or fewer software modules (e.g., combined functionality) may be employed in the memory 48 or additional memory. In some embodiments, a separate storage device may be coupled (e.g., via a data bus), such as a persistent memory (e.g., optical, magnetic, and/or semiconductor memory and associated drives). In some embodiments, functionality of the various circuitry may be combined into a single unit or package of circuitry.

Execution of the roving repeater software 52, navigational guidance software 56, auto steering mechanism 58, and/or other software such as machine operational control software may be implemented by the processor 46 under the management and/or control of the operating system 54. The processor 46 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations. In some embodiments, functionality of all or a portion of the roving repeater software 52 may be achieved via logic in a baseband circuit (e.g., a digital signal processor or DSP).

When certain embodiments of the roving repeater unit 40 are implemented at least in part as software (including firmware), it should be noted that the roving repeater software 52 can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the roving repeater unit 40 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
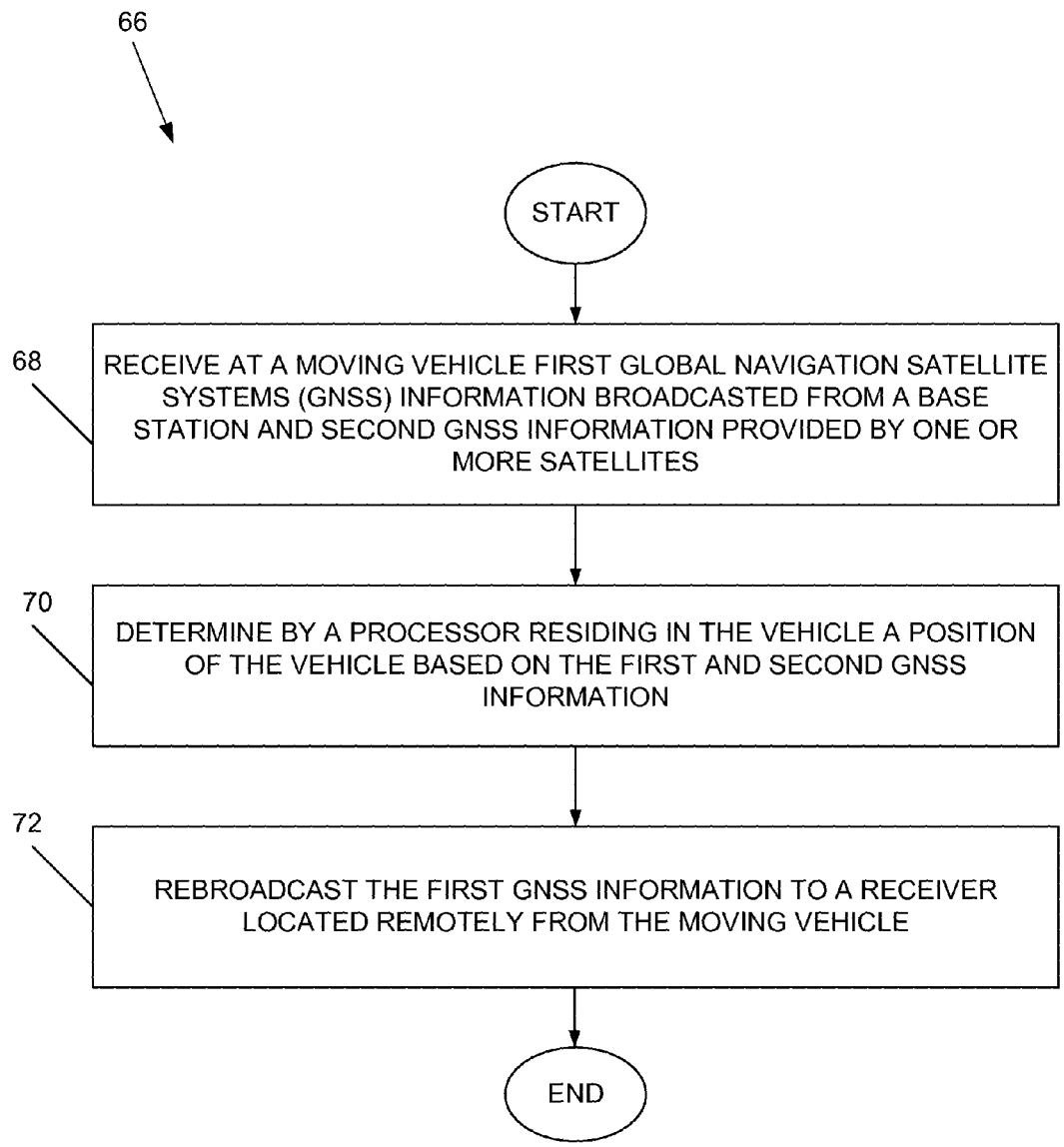
FIG. 3 is a flow diagram that illustrates an embodiment of an example GNSS information repeater method.

In view of the above description, it should be appreciated that one embodiment of a GNSS information repeater method 66, depicted in FIG. 3, comprises receiving at a moving vehicle first Global Navigation Satellite Systems (GNSS) information broadcasted from a base station and second GNSS information provided by one or more satellites (68). For instance, the first GNSS information comprises RTK correction information (and optionally reliability information) and the second GNSS information comprises satellite signals. In some embodiments, the moving vehicle may receive the RTK correction information from the base station via an intermediary network or networks, such as networks comprising a cell phone carrier network and server (e.g., Internet) or computer network. The GNSS information repeater method 66 further comprises determining by a processor residing in the vehicle a position of the vehicle based on the first and second GNSS information (70). The position of the vehicle may be computed to centimeter (e.g., 2 cm) accuracy, and used in some embodiments as input to a navigational guidance system (e.g., the hydraulic and mechanical components actuated or controlled by the navigational guidance software 56) of the vehicle for autonomous (or semi-autonomous) guided movement along a field. The GNSS information repeater method 66 further comprises rebroadcasting the first GNSS information to a receiver located remotely from the moving vehicle (72). The receiver may be hosted by a fixed, or semi-permanently positioned repeater, and/or part of another roving repeater unit. The computation of the position of the vehicle based on the first and second GNSS information and the rebroadcast may be achieved substantially concurrently.

Any process descriptions or blocks in flow diagrams should be understood as representing steps and/or modules, segments, or portions of code which include one or more executable instructions for implementing specific logical functions or steps in the process, and alternate implementations are included within the scope of the embodiments in which functions may be executed out of order from that shown or discussed, including substantially concurrently, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A system, comprising:
    a base station comprising a global navigation satellite systems (GNSS) receiver and transmitter circuitry, the transmitter circuitry configured to wirelessly transmit first GNSS information;
    a first vehicle comprising a GNSS receiver, and receiver circuitry and transmitter circuitry configured to receive and wirelessly transmit, respectively, the first GNSS information, and further configured to transmit an indicator of reliability including a number of times the first GNSS information has been repeated; and
    a second vehicle comprising a GNSS receiver, and receiver circuitry configured to receive the first GNSS information and the indicator of reliability from the first vehicle, the receiver circuitry configured to select the first GNSS information only if the number of times the first GNSS information has been repeated is below a predetermined threshold,
    wherein the GNSS receivers of the base station, the first vehicle, and the second vehicle are each configured to receive second GNSS information from a satellite network,
    wherein the first vehicle and the second vehicle each comprises a respective processor configured to process the second GNSS information based on the first GNSS information and use the processed second GNSS information to determine a respective position of the first and second vehicle,
    wherein the first vehicle and the second vehicle each comprises an auto steering mechanism that operates according to the processed second GNSS information.

2. The system of claim 1, wherein the first GNSS information comprises GNSS real time kinematic (RTK) correction information and reliability information and the second GNSS information comprises GNSS satellite signals.

3. The system of claim 1, wherein the receiver and transmitter circuitry of the first vehicle receives and transmits, respectively, the first GNSS information while the first vehicle is in motion.

4. The system of claim 1, wherein the receiver circuitry of the second vehicle receives the first GNSS information while the second vehicle is in motion.

5. The system of claim 1, wherein the second vehicle further comprises transmitter circuitry configured to transmit the first GNSS information and a second indicator of reliability to another vehicle or remote device.

6. The system of claim 1, wherein the base station is disposed at a fixed and known location.

7. The system of claim 1, wherein the transmitter circuitry of the base station transmits the first GNSS information based on tracking a phase of one or more signals of a satellite signal received by the GNSS receiver of the base station.

8. A system, comprising:
    a base station comprising a global navigation satellite systems (GNSS) receiver, and a transmitter configured to broadcast real time kinematics (RTK) correction information according to a first communications range;
    a first vehicle located within the first communications range and within a range of validity of the RTK correction information, the first vehicle comprising a GNSS receiver and transmitter and receiver circuitry, the receiver circuitry configured to receive the RTK correction information from the base station, the transmitter circuitry configured to rebroadcast the RTK correction information according to a second communications range that partially overlaps the first communications range, the transmitter circuitry further configured to transmit an indicator of reliability including a number of times the first GNSS information has been repeated; and
    a second vehicle located outside of the first communications range and within the second communications range and within the range of validity, the second vehicle comprising a processor, a GNSS receiver configured to receive satellite signals, and receiver circuitry, the receiver circuitry configured to receive the RTK correction information and the indicator of reliability from the transmitter circuitry of the first vehicle, the processor configured to determine a position of the second vehicle based on the satellite signals and the RTK correction information only if the number of times the first GNSS information has been repeated is below a predetermined threshold,
    wherein the second vehicle further comprises a navigational guidance system that autonomously guides movement of the second vehicle based on the determined position.

9. The system of claim 8, wherein the first vehicle further comprises a processor, wherein the GNSS receiver of the first vehicle is configured to receive the satellite signals and the processor of the first vehicle is configured to determine a position of the first vehicle based on the satellite signals and the RTK correction information.

10. The system of claim 9, wherein the first vehicle further comprises a navigational guidance system that autonomously guides movement of the first vehicle based on the determined position.

11. The system of claim 8, wherein the GNSS receiver of the base station is configured to track carrier phase information of one or more signals of the satellite signals.

12. The system of claim 8, wherein the RTK correction information further comprises an indication of reliability of the RTK correction information.

13. The system of claim 8, wherein the first vehicle comprises gateway functionality to receive the RTK correction signals from the base station via one or more networks.

14. The system of claim 8, further comprising a third vehicle located outside of the first and second communications ranges, wherein the second vehicle rebroadcasts the RTK correction information according to a third communications range to the third vehicle and transmits a second indicator of reliability including a number of times the first GNSS information has been repeated, wherein the third vehicle is located within the third communications range.

15. A method, comprising:
   receiving at a moving vehicle first global navigation satellite systems (GNSS) information broadcasted from a base station and second GNSS information provided by one or more satellites;
   determining by a processor residing in the vehicle a position of the vehicle based on the first and second GNSS information and an indicator of reliability including a number of times the first GNSS information has been repeated; and
   rebroadcasting the first GNSS information, and broadcasting the indicator of reliability, to a receiver located remotely from the moving vehicle,
   wherein the vehicle comprises an auto steering mechanism, further comprising automatically adjusting a heading of the vehicle using the auto steering mechanism according to the determined position.

\* \* \* \* \*